United States Patent
Zhou et al.

(10) Patent No.: US 11,375,547 B2
(45) Date of Patent: Jun. 28, 2022

(54) CONTROL INFO TUNNELING TO INCREASE PDCCH COVERAGE

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Xiaoxia Zhang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 16/582,696

(22) Filed: Sep. 25, 2019

(65) Prior Publication Data

US 2020/0107368 A1 Apr. 2, 2020

Related U.S. Application Data

(60) Provisional application No. 62/738,738, filed on Sep. 28, 2018.

(51) Int. Cl.
*H04W 74/08* (2009.01)
*H04W 72/12* (2009.01)
(Continued)

(52) U.S. Cl.
CPC ........ *H04W 74/0833* (2013.01); *H04B 7/155* (2013.01); *H04W 24/08* (2013.01);
(Continued)

(58) Field of Classification Search
CPC . H04B 1/38; H04B 7/15; H04B 7/155; H04B 7/15507; H04B 7/15514–17;
(Continued)

(56) References Cited

U.S. PATENT DOCUMENTS

2013/0044627 A1 2/2013 Jen
2015/0334637 A1 11/2015 Kim et al.
(Continued)

OTHER PUBLICATIONS

"Evolved Universal Terrestrial Radio Access (E-UTRA) and Evolved Universal Terrestrial Radio Access Network (E-UTRAN); Overall description; Stage 2," 3GPP, TS 36.300 V15.5.0 (Mar. 2019), https://portal.3gpp.org/desktopmodules/Specifications/SpecificationDetails.aspx?specificationId=2430, pub'd (Year: Apr. 17, 2019).*
(Continued)

*Primary Examiner* — Thomas R Cairns
(74) *Attorney, Agent, or Firm* — Arent Fox, LLP

(57) ABSTRACT

Aspects of the present disclosure provide techniques for tunneling control information associated with random access procedure (RACH) from a fifth generation (5G) new radio (NR) base station (e.g., secondary base station (SgNB)) to the user equipment (UE) via long term evolution (LTE) master base station (e.g., "MeNB") in order to extend the coverage of the SgNB. The tunneled PDCCH control information may include one or more of frequency domain resource assignment, time domain resource assignment (e.g., physical downlink shared channel (PDSCH) scheduled slot index, start symbol index and duration in the slow), and/or modulation coding scheme (MCS).

30 Claims, 8 Drawing Sheets

(51) Int. Cl.
*H04W 76/10* (2018.01)
*H04W 24/08* (2009.01)
*H04B 7/155* (2006.01)
*H04W 24/10* (2009.01)
*H04W 88/08* (2009.01)

(52) U.S. Cl.
CPC ....... *H04W 24/10* (2013.01); *H04W 72/1278* (2013.01); *H04W 76/10* (2018.02); *H04W 88/08* (2013.01)

(58) Field of Classification Search
CPC ... H04B 7/18517; H04B 7/204; H04L 5/0035; H04L 29/06088; H04L 29/06551; H04L 29/12009; H04L 41/145; H04L 43/00; H04L 43/06; H04L 47/74; H04M 1/72; H04W 8/005; H04W 8/20; H04W 8/26; H04W 12/02; H04W 16/18; H04W 16/26; H04W 24/02; H04W 24/10; H04W 28/04; H04W 28/08; H04W 28/12; H04W 36/00; H04W 36/0022; H04W 36/0033; H04W 36/0069; H04W 36/0077; H04W 36/0083; H04W 36/0088; H04W 36/14; H04W 40/24; H04W 48/02; H04W 52/365; H04W 72/08; H04W 72/1278; H04W 72/1284–1294; H04W 72/14; H04W 74/002; H04W 74/006; H04W 74/0833; H04W 74/0841–0858; H04W 76/10; H04W 76/11–15; H04W 76/16; H04W 76/18–19; H04W 84/047; H04W 84/18; H04W 88/04; H04W 88/08; H04W 88/085–10; H05K 5/00; H05K 7/00
See application file for complete search history.

(56) References Cited

U.S. PATENT DOCUMENTS

2016/0050607 A1* 2/2016 Gao .................... H04W 36/22
370/252
2021/0243683 A1* 8/2021 Harada ................ H04W 48/08

OTHER PUBLICATIONS

"E-UTRA and E-UTRAN; Overall description; Stage 2 (Release 15)," 3GPP, TS 36.300 V15-2.0 (Jun. 2018), https://portal.3gpp.org/desktopmodules/Specifications/SpecificationDetails.aspx?specificationId=2430, uploaded Jul. 7, 2018, accessed Dec. 4, 2021 (Year: 2018).*
International Search Report and Written Opinion—PCT/US2019/053269—ISA/EPO—dated Dec. 19, 2019.

* cited by examiner

CONTROL INFO TUNNELING TO INCREASE PDCCH COVERAGE

CLAIM OF PRIORITY UNDER 35 U.S.C. § 119

This application claims priority to U.S. Provisional Application Number 62/738,738 titled "CONTROL INFO TUNNELING TO INCREASED PDCCH COVERAGE," filed Sep. 28, 2018, which is assigned to the assignee hereof, and incorporated herein by reference in its entirety.

BACKGROUND

The present disclosure relates to wireless communication systems, and more particularly, to tunneling (or relay) control information associated with random access procedure (RACH) from a fifth generation (5G) new radio (NR) base station (e.g., secondary 5G NR base station) to the user equipment (UE) via long term evolution (LTE) master base station.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

However, mobile networks are facing soaring demands for mobile data as consumers increasingly utilize mobile devices to share and consume high-definition multi-media. In addition, as the capabilities of mobile devices continue to grow with advancements such as higher-resolution cameras, 4K video, always-connected cloud computing, and virtual/augmented reality, so does the ever-increasing demand for faster and improved connectivity. Enhancing mobile broadband services is one of the driving forces behind a 5G wireless communications technology (which can be referred to as new radio (NR)) that is envisaged to expand and support diverse usage scenarios and applications with respect to current mobile network generations.

One aspect of the 5G NR communications technology includes the use of high-frequency spectrum bands above 24 GHz, which may be referred to as millimeter wave (mmW). The use of these bands is compelling as the large bandwidths available at these high frequencies enable extremely high data rates and significant increases in capacity. However, there may be some limitations in the usage of mmW bands, such as lack of robustness for mobile broadband applications due to increased propagation loss and susceptibility to blockage (e.g., hand, head, body, foliage, buildings or other structures). As such, compared to lower frequency communication systems, distance between base stations in a mmW communication system may be very short (e.g., 150-200 meters), which may require deployment of large number of base stations in close proximity. Such base stations having relatively smaller coverage areas, as compared to the coverage area of typical cellular base stations (e.g., having higher transmit power and/or utilizing lower frequency transmissions), may be referred to as small cell base stations or small cells.

Due to the smaller coverage area of NR base stations employing mmW communication system, UEs attempting to access the NR cell may be adversely impacted. For example, generally when a UE is switched on or transitions from an idle state (or handover from a different base station), the UE may start searching for a network by transmitting a RACH preamble (e.g., a specific pattern or signature associated with the UE that may be referred to as "Message 1" in the RACH procedure) to a base station. In response to the reception of RACH preamble from the UE, the base station may transmit a random access response to the UE (also referred to as "Message 2") on downlink shared channel. The "Message 2" may generally carry control information such as temporary cell radio network temporary identity (C-RNTI), timing advance value (e.g., base station informs the UE to change its timing so it can compensate for the round trip delay caused by UE distance from the base station), and/or uplink grant resource (e.g., base station may assign initial resources to UE so that the UE can use uplink shared channel).

In NR wireless communications systems, the "Message 2" is generally transmitted from the base station using a low-gain transmission beam and is limited to single decoding because the UE is required to perform blind decoding of the physical downlink control channel (PDCCH) payload as it is not aware of the detailed control channel structure, including the number of control channels and the number of CCEs to which each control channel is mapped. Thus, given the increased propagation loss, susceptibility to blockage, and limited coverage of mmW bands in NR communication systems, the coverage area of transmissions of Message 2 may be limited and thereby adversely impact the UEs attempting to synchronize to the NR cell.

Thus, as the demand for mobile broadband access continues to increase, further improvements in NR communications technology and beyond may be desired.

SUMMARY

Aspects of the present disclosure provide techniques for tunneling (or relaying/forwarding) control information (e.g., scheduling information) associated with RACH from 5G NR base station (e.g., secondary base station (SgNB)) to the UE via LTE master base station (e.g., "MeNB") in order to extend the coverage of the SgNB. The tunneled PDCCH control information may include one or more of frequency domain resource assignment, time domain resource assignment (e.g., physical downlink shared channel (PDSCH) scheduled slot index, start symbol index and duration in the slot), and/or modulation coding scheme (MCS).

In one example, a method, apparatus, and computer readable medium for wireless communications implemented by a base station is disclosed. The method may include determining, at a master base station, that a first node in communication with the master base station is also in a coverage area of a second node based on signal measurement results received from the first node. The method may include transmitting a request to the second node to initiate addition of the second node for the first node. The method may include receiving, at the master base station, scheduling information for a physical channel message from the second node in response to the request. The method may include relaying the scheduling information from the second node to the first node via the master base station prior to the first node and the second node initiating a RACH procedure.

In an aspect, the scheduling information relayed to the first node by the master base station comprises one or more of frequency domain resource assignment, time domain resource assignment, modulation coding scheme (MCS), or virtual resource block (VRB)-to-physical resource block (PRB) information. The scheduling information may further include one or more predetermined scheduled slot indices for the first node to search for a physical downlink shared channel (PDSCH) message after transmitting a PRACH preamble.

In an aspect, the master base station is a long term evolution (LTE) base station and the second node is a new radio (NR) base station configured to communicate over millimeter wave (mmW) band.

In an aspect, the method may further include forwarding a packet to the second node. The packet may include a physical uplink shared channel (PUSCH) transmission from the first node.

In an aspect, the first node is a base station and the second node is a UE.

In another aspect, first node is a UE and the second node is a base station.

The apparatus for wireless communications may include a memory configured to store instructions and a processor communicatively coupled with the memory. The processor may be configured to execute the instructions to determine, at a master base station, that a first node in communication with the master base station is also in a coverage area of a second node based on signal measurement results received from the first node. The processor may be configured to execute the instructions to transmit a request to the second node to initiate addition of the second node for the first node. The processor may be configured to execute the instructions to receive, at the master base station, scheduling information for a physical channel message from the second node in response to the request. The processor may be configured to execute the instructions to relay the scheduling information from the second node to the first node via the master base station prior to the first node and the second node initiating a RACH procedure.

In another example, a method, apparatus, and computer readable medium for wireless communications implemented by a UE is disclosed. The method may include receiving, at a first node, a measurement request from a master base station, wherein the first node and the master base station have an established communication link. The method may include measuring, at the first node, signal quality for signals received from a second node. The method may include transmitting, by the first node to the master base station, measurement results associated with the signals received by the first node from the second node, wherein the measurement results indicate that the first node is in coverage area of the second node. The method may include receiving, from the master base station, scheduling information associated with a physical channel message from the second node, wherein the scheduling information is relayed to the first node via the master base station. The method may include initiating a RACH procedure between the first node and the second node based on the scheduling information.

In an aspect, the physical channel message is a PDSCH and the method further includes determining, at the first node, scheduling for the PDSCH message by the second node based on the scheduling information relayed via the master base station. The scheduling information relayed to the first node by the master base station may include one or more of frequency domain resource assignment, time domain resource assignment, modulation coding scheme (MCS), or virtual resource block (VRB)-to-physical resource block (PRB) information. The scheduling information may further include one or more predetermined scheduled slot indices for the first node to search for the PDSCH message after transmitting a PRACH preamble.

In an aspect, the method may further include transmitting a PRACH preamble to the second node to initiate the RACH procedure. The method may further include receiving a first node dedicated sequence for reference timing from the second node in response to transmission of the PRACH preamble. The method may further include determining a scheduled slot for the physical channel message during a response window based on the first node dedicated sequence. The method may further include searching the scheduled slot during a response window for the physical channel message.

In an aspect, the master base station is a long term evolution (LTE) base station and the second node is a new radio (NR) base station configured to communicate over millimeter wave (mmW) band.

In an aspect, the method includes transmitting, by the first node, a physical uplink shared channel (PUSCH) content to the second node, wherein the PUSCH content is sent by the first node in response to a request from the second node for a RACH preamble transmission by the first node in RACH procedure with the second node. The PUSCH content may include a first node identification (ID).

In an aspect, the method may further include transmitting a PRACH preamble to the second node to initiate the RACH procedure. The method may further include receiving a response from the second node in response to transmission of the PRACH preamble. The method may further include transmitting a first node dedicated sequence for reference timing from the first node in response to reception of the response. The transmission of the first node dedicated sequence may replace transmission of a physical uplink shared channel (PUSCH) whose content is relayed to the second node via the master base station.

The apparatus for wireless communications may include a memory configured to store instructions; and a processor communicatively coupled with the memory. The processor may be configured to execute the instructions to receive, at a first node, a measurement request from a master base station, wherein the first node and the master base station have an established communication. The processor may be configured to execute the instructions to measure, at the first node, signal quality for signals received from a second node. The processor may be configured to execute the instructions to transmit, by the first node to the master base station, measurement results associated with the signals received by the first node from the second node, wherein the measurement results indicate that the first node is in coverage area of the second node. The processor may be configured to execute the instructions to receive, from the master base station, scheduling information associated with a physical channel message from the second node, wherein the scheduling information is relayed to the first node via the master base station. The processor may be configured to execute the instructions to initiate a random access channel (RACH) procedure between the first node and the second node based on the scheduling information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
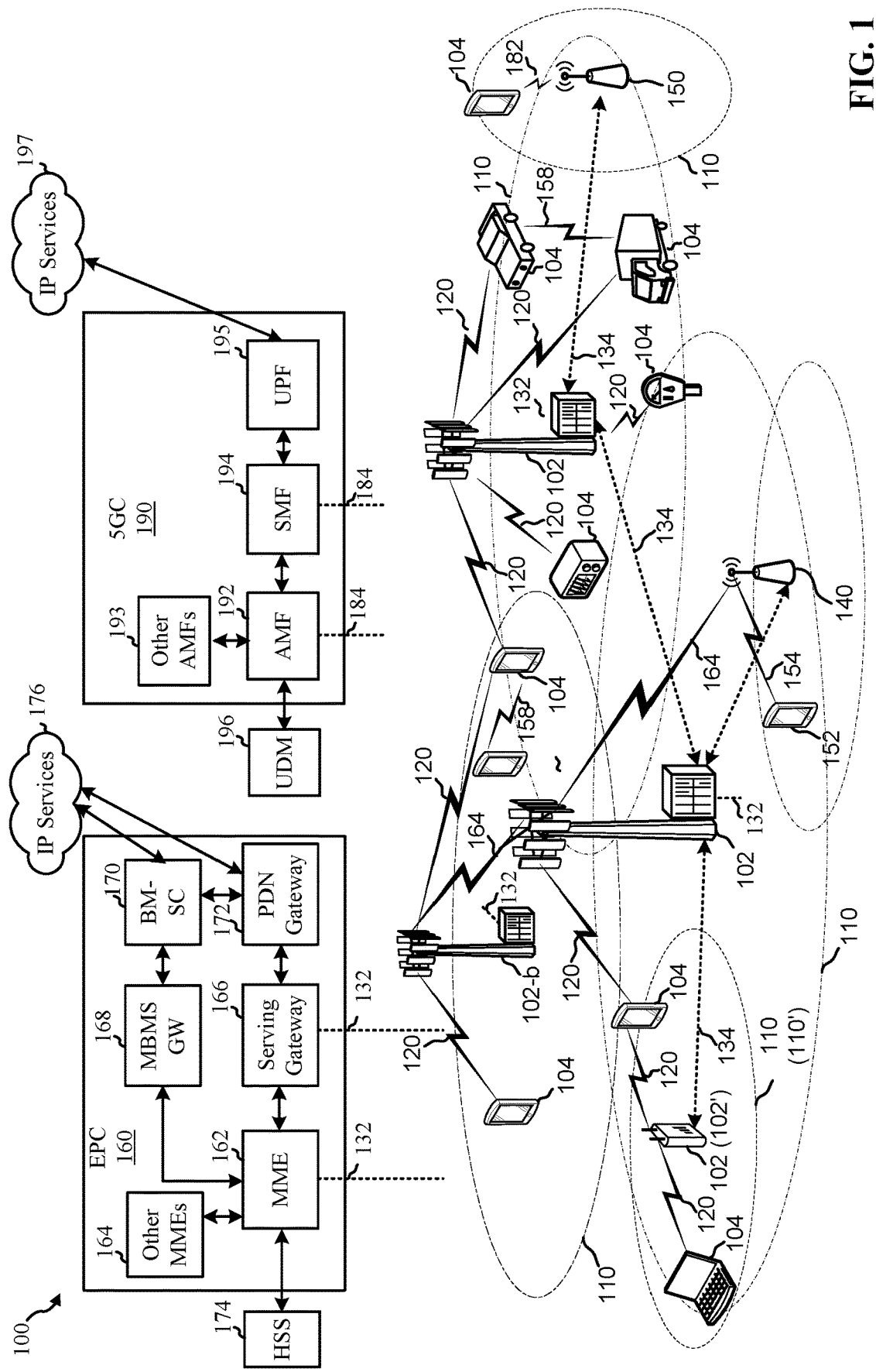
FIG. 1 is a schematic diagram of an example of a wireless communications system in accordance with aspects of the present disclosure.

As discussed above, one aspect of the 5G NR communications technology includes the use of high-frequency spectrum bands above 24 GHz, which may be referred to as mmW. The use of these bands enable extremely high data rates and significant increases in data processing capacity. However, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, can change the channel conditions between the base station and the UE, and thus impact communication performance. Thus, mmW communication systems generally have a smaller coverage area as compared to the coverage area of typical cellular base stations (e.g., having higher transmit power and/or utilizing lower frequency transmissions).

The smaller coverage area of NR base stations employing mmW communication system may adversely impact UEs attempting to access the NR cell. Specifically, in NR wireless communications systems, the "Message 2" for RACH is generally transmitted from the base station to the UE using a low-gain transmission beam and is thus limited to single decoding because the UE is required to perform blind decoding of the PDCCH payload as it is not aware of the detailed control channel structure. Thus, given the increased propagation loss, susceptibility to blockage, and limited coverage of mmW bands in NR communication systems, the coverage area of transmissions of Message 2 may be limited and thereby adversely impact the UEs attempting to synchronize to the NR cell.

Aspects of the present disclosure provide techniques for tunneling control information associated with RACH from SgNB to the UE via MeNB in order to extend the coverage of the SgNB. The tunneled PDCCH control information may include one or more of frequency domain resource assignment, time domain resource assignment (e.g., PDSCH scheduled slot index, start symbol index and duration in the slot), and/or MCS, including virtual resource block (VRB) to physical resource block (PRB) mapping.

Further, in situations where PDSCH is scheduled by PDCCH transmitted by the base station, the scheduled slot for the UE may be determined by the scheduling PDCCH slot index as reference in addition to a signaled slot offset. However, in absence of the PDCCH transmission (e.g., when the control information is instead tunneled from SgNB to the UE via MeNB), aspects of the present disclosure may provide the reference timing for the scheduled slot by either tunneling the scheduled slot indices to the UE via the MeNB or by the NR cell transmitting a sequence dedicated to the UE to provide reference timing. In the instance of the network tunneling the scheduled slot indices to the UE, the UE may search the identified scheduled slots for Message 2 PDSCH after transmitting the PRACH preamble. Alternatively, in the instance of the NR cell transmitting a sequence dedicated to the UE to provide reference timing, the UE may determine the scheduled slot based on the sequence received from the NR cell. In some examples, the sequence may be scrambled or initialized by a UE dedicated seed.

Various aspects are now described in more detail with reference to the FIGS. 1-8. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system 100 for tunneling control information associated with RACH from SgNB (e.g., NR base station 150) to the UE 104 via MeNB (e.g., LTE base station 102) in order to extend the coverage of the SgNB. Thus, the wireless communications system 100 may include one or more LTE base stations 102, one or more 5G NR base stations 150, one or more UEs 104, an Evolved Packet Core (EPC) 160, and a 5G Core (5GC) 190.

In some examples, the 5G NR base stations 150 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

As noted above, communications using the mmW and/or near mmW radio frequency band have extremely high path loss and a short range. Thus, the propagation characteristics of the mmWave environment demands deployment of dense next generation node bases (gNBs) 150 (i.e., base stations 150 in NR technology) to guarantee line-of-sight links at any given time and decrease the outage probability. However, given the increased propagation loss, susceptibility to blockage, and limited coverage of mmW bands in NR communication systems, the coverage area of gNBs 150 may be limited and thereby adversely impact the UEs 104 attempting to synchronize to the NR cell. To this end, aspects of the present disclosure include techniques implemented by the communication management component 550 of the base station 102 (e.g., MeNB) to tunnel control information (e.g., route or pass the control information) associated with RACH from a secondary gNB (SgNB) 150 to the UE 104 via MeNB 102 in order to extend the coverage of the SgNB 150. The tunneled PDCCH control information may include one or more of frequency domain resource assignment, time domain resource assignment (e.g., PDSCH scheduled slot index, start symbol index and duration in the slot), and/or MCS, including VRB-to-PRB mapping.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The 5G NR base stations 150 configured for 5G NR (collectively referred to as Next Generation RAN (NG-RAN)) may interface with 5GC 190 through backhaul links 184. For purposes of this disclosure, the base stations 102 configured for 4G LTE and 5G NR base station 150 configured for 5G NR may be interchangeably and collectively referred to simply as base stations. In addition to other functions, the base stations 102/150 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102/150 may wirelessly communicate with the UEs 104. Each of the base stations 102/150 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 140 in communication with Wi-Fi stations (STAs) 152 (which may also be UEs) via communication links 154 in a 5 GHz unlicensed frequency spectrum. When communicating in an unlicensed frequency spectrum, the STAs 152/AP 140 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 140. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 150 may operate in a traditional sub 6 GHz spectrum, in millimeter wave (mmW) frequencies, and/or near mmW frequencies in communication with the UE 104. When the gNB 150 operates in mmW or near mmW frequencies, the gNB 150 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 150 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may also discover CV2X services supported by the host UE 104. Moreover, a UE 104 may act as both a host and a client. For example, a vehicle may act as a host to provide speed and braking updates to surrounding vehicles and/or act as a client to communicate with a tolling station.

Figure 2:
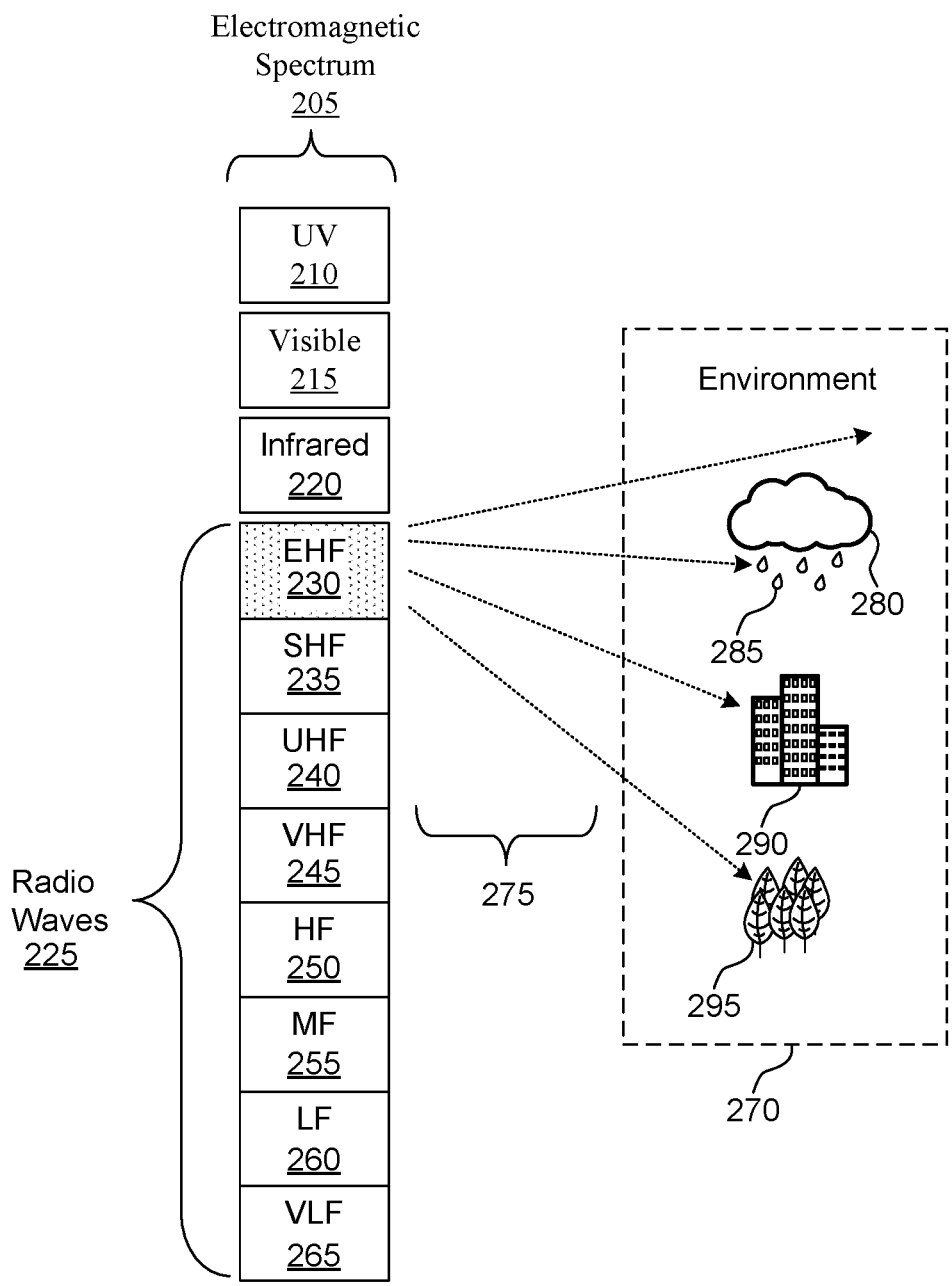
FIG. 2 is a spectrum diagram that illustrates aspects of the frequency range in which some of the communications described herein are performed in accordance with aspects of the present disclosure.

FIG. 2 illustrates a spectrum diagram 200 that illustrates aspects of the frequency range in which some of the communications described herein are performed in accordance with aspects of the present disclosure. Spectrum diagram 200 may include the following components: electromagnetic spectrum 205 and environment 270.

In some examples, electromagnetic spectrum 205 may include the following components: ultra-violet (UV) radiation 210, visible light 215, infrared radiation 220, and radio waves 225. The mmW portion (or extremely high frequency (EHF band 230)) of the electromagnetic spectrum corresponds to electromagnetic radiation with a frequency of 30-300 GHz and a wavelength between 1 mm and 1 cm. Near MMW may extend down to a frequency of 3 GHz with a wavelength of 100 millimeters.

In some examples, radio waves 225 may include the following components: EHF band 230, super high frequency (SHF) band 235, ultra-high frequency (UHF) band 240, very high frequency (VHF) band 245, high frequency (HF) band 250, medium frequency (MF) band 255, low frequency (LF) band 260, and very low frequency (VLF) band 265. The EHF band 230 lies between the SHF band 235 and the infrared radiation 220 band. The SHF band 235 may also be referred to as the centimeter wave band. In some examples, environment 270 may include the following components: mmW radiation 275, atmosphere 280, rain 285, obstacle 290, and foliage 295.

In some examples, the wireless communication system 100 may be a mmW communication system. The mmW communication systems may include transmissions in mmW frequencies and/or near mmW frequencies. In mmW communication systems (e.g., an access network), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data.

Thus, while the use of the mmW bands is compelling as the large bandwidths available at these high frequencies enable extremely high data rates and significant increases in capacity, mmW bands are highly susceptible to rapid channel variations and suffer from severe free-space path loss and atmospheric absorption. In other words, at mmW frequencies, even small variations in the environment, such as the turn of the head, movement of the hand, or a passing car can change the channel conditions between the base station and the UE, and thus impact performance.

As such, base stations 102 and/or UEs 104 operating according to the mmW technology may utilize beamforming in their transmissions to compensate for the extremely high path loss and short range. Particularly, the 5G NR systems may leverage the massive MIMO antenna arrays to create highly directional beams of small wavelengths that focus transmitted RF energy in order to attempt to overcome the propagation and path loss challenges in both the uplink and downlink. In some aspects of the wireless communication system 100, base stations 102 or UEs 104 may include multiple antennas for employing antenna diversity schemes to improve communication quality and reliability between base stations 102 and UEs 104. Thus, the base stations 102 or UEs 104 may employ MIMO techniques that may take advantage of multi-path environments to transmit multiple spatial layers carrying the same or different coded data.

Figure 3:
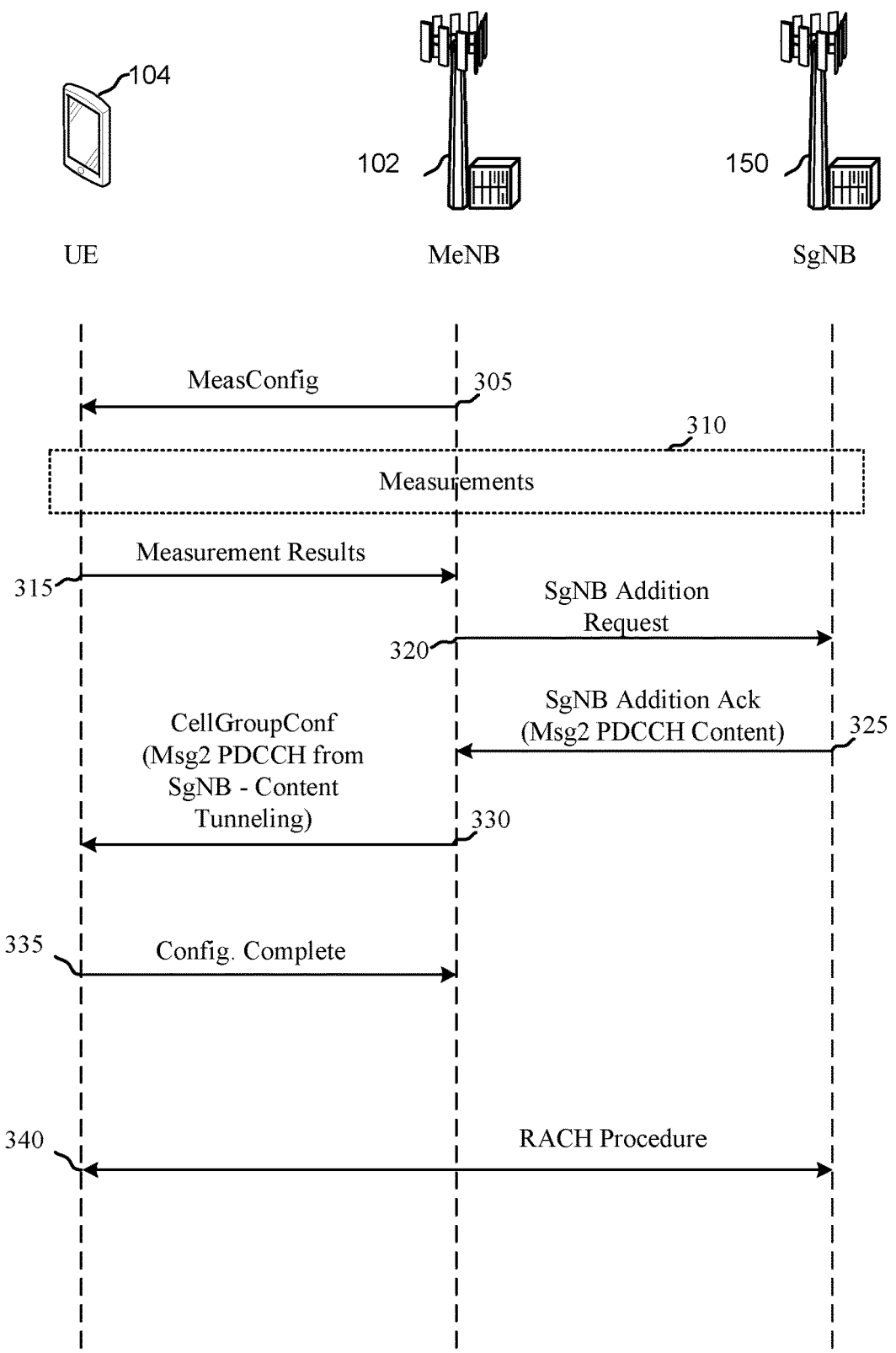
FIG. 3 is a timing diagram for tunneling control information from SgNB to the UE via MeNB in accordance with aspects of the present disclosure.

FIG. 3 illustrates a message diagram 300 for tunneling control information associated with RACH procedure from the SgNB 150 to the UE 104 via the MeNB 102. In some examples, the MeNB 102, SgNB 150, and the UE 104 may be examples of base stations (e.g., LTE base station 102 and NR base station 150) and UEs 104 discussed above with reference to FIG. 1. In some examples, the UE 104 may be connected to an LTE cell managed by MeNB 102. However, in some instances, the UE 104 that may be in coverage area of NR cell (e.g., SgNB 150), and thus the UE 104 may attempt to establish communication with the SgNB 150 for higher throughput via mmW band.

To this end, the MeNB 102, at 305, may transmit a measurement configuration message to the UE 104. In response, the UE 104, at 310, may perform signal measurements (e.g., received signal strength indicator (RSSI), reference signal received power (RSRP), or reference signal received quality (RSSQ)) associated with the SgNB 150 to determine whether the UE 104 may be able to realize increased data throughput from the mmW communication with the SgNB 150. The UE 104 may transmit the measurement results 315 to the MeNB 102. Based on the measurement results, the MeNB 102 may determine that the UE 104 may benefit from connecting to the SgNB 150 that may be a mmW NR base station. Accordingly, the MeNB 102, at 320, may transmit a request to add SgNB for the UE 104. For example, the request may be a request to add SgNB 150 as a secondary serving cell for the UE 104. As another example, the request may be considered a request to add the UE 104 to the SgNB 150.

In response to the SgNB addition request, the SgNB 150 may transmit an SgNB addition acknowledgement message 325 back to the MeNB 102. In some examples, the SgNB addition acknowledgement message 325 may include the Message 2 PDCCH content from the SgNB 150. That is, the Message 2 PDCCH content may be transmitted via the MeNB instead of or in addition to a PDCCH transmitted by the SgNB. In some examples, the Message 2 PDCCH content may include PDCCH control information including one or more of frequency domain resource assignment, time domain resource assignment (e.g., PDSCH scheduled slot index, start symbol index and duration in the slot), and/or MCS, including VRB-to-PRB) mapping. Accordingly, the Message 2 PDCCH content may be considered scheduling information.

In response to receiving the SgNB addition acknowledgment message 325, the MeNB 102 may tunnel (or forward/relay) the Message 2 PDCCH content information from the SgNB 150 to the UE 104 as part of the cell group configuration message 330. The UE 104 may add the SgNB to the set of serving cells (e.g., as a secondary cell). The UE 104 may transmit a configuration complete message 335 to the MeNB 102. At 340, the UE 104 and the SgNB 150 may initiate the RACH procedure based on the PDCCH content tunneled from the SgNB 150 to the UE 104 via the MeNB 102.

Further, as noted above, in situations where PDSCH is scheduled by PDCCH transmitted by the base station, the scheduled slot for the UE 104 may be determined by the scheduling PDCCH slot index as reference in addition to a signaled slot offset. However, in absence of the PDCCH transmission (e.g., when the control information is instead tunneled from SgNB to the UE via MeNB), aspects of the present disclosure may provide the reference timing for the scheduled slot by either tunneling the scheduled slot indices to the UE via the MeNB or by the NR cell transmitting a sequence dedicated to the UE to provide reference timing.

Figure 4A:
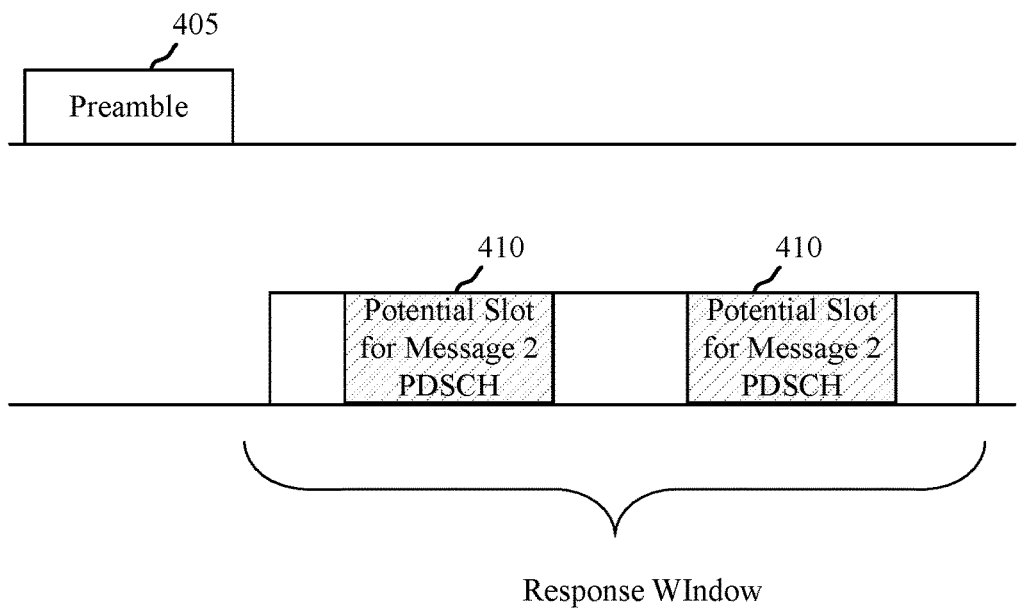
FIGS. 4A and 4B are schematic diagrams of UE searching for slots for Message 2 PDSCH during a response window in accordance with aspects of the present disclosure.

To this end, FIG. 4A includes a schematic diagram 400 of a first technique for signaling the reference timing to the UE 104 from the SgNB 150. In such example, the indices of one or more potential scheduled slots 410 may be included in the tunneled PDCCH content information such that the UE 104 may search the identified scheduled slots for Message 2 PDSCH after transmitting PRACH preamble 405. Thus, in this option, indices of the potential scheduled slots 410 may be relayed to the UE 104 such that the UE 104 may search only those potential scheduled slots 410 for Message 2 PDSCH following the transmission of the PRACH preamble 405. The potential scheduled slots 410 may start from Slot 0 in frame 0 with predetermined periodicity of X slots. In some examples, the potential scheduled slots 410 with predetermined periodicity of Xslots may start from a slot offset after the end of the RACH occasion and transmission of the RACH preamble 405. In some examples, the potential scheduled slots 410 may be limited to only one slot or multiple slots in the response window. Thus, the UE 104 may restrict decoding to only the potential scheduled slots 410 that are identified in the tunneled content information.

Figure 4B:
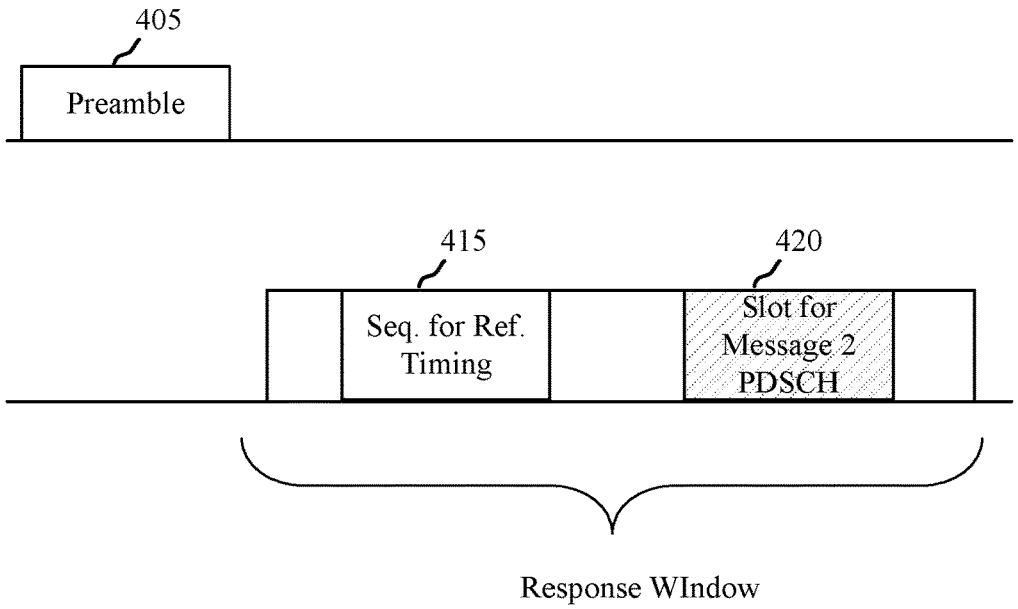

Alternatively, as illustrated in the schematic diagram 450 of FIG. 4B, the SgNB 150, instead of transmitting the PDCCH, may transmit a sequence 415 dedicated to the UE 104 in order to allow the UE 104 to determine the reference timing information. Specifically, in accordance with the second technique, the SgNB 150 may transmit a sequence dedicated to the UE 104 such that the scheduled slot 420 may be determined based on the sequence 415 information. In some examples, the UE dedicated sequence 415 may be a PDCCH demodulation reference signal (DMRS), channel state information-reference signal (CSI-RS), or total radiated sensitivity (TRS). The sequence may be scrambled/initialized by the UE dedicated seed, which may also be tunneled to the UE 104 via the MeNB 102 so that the UE 104 may identify the UE dedicated sequence 415. In some examples, the UE dedicated seed may be determined at least by information of a PRACH resource dedicated to the UE 104 (e.g., dedicated preamble index). In some aspects, the sequence can be repeated with the configuration message tunneled to the UE 104. In this example, the UE may be restricted to monitoring the sequence only in the response window corresponding to the transmitted preamble 405.

Figure 5:
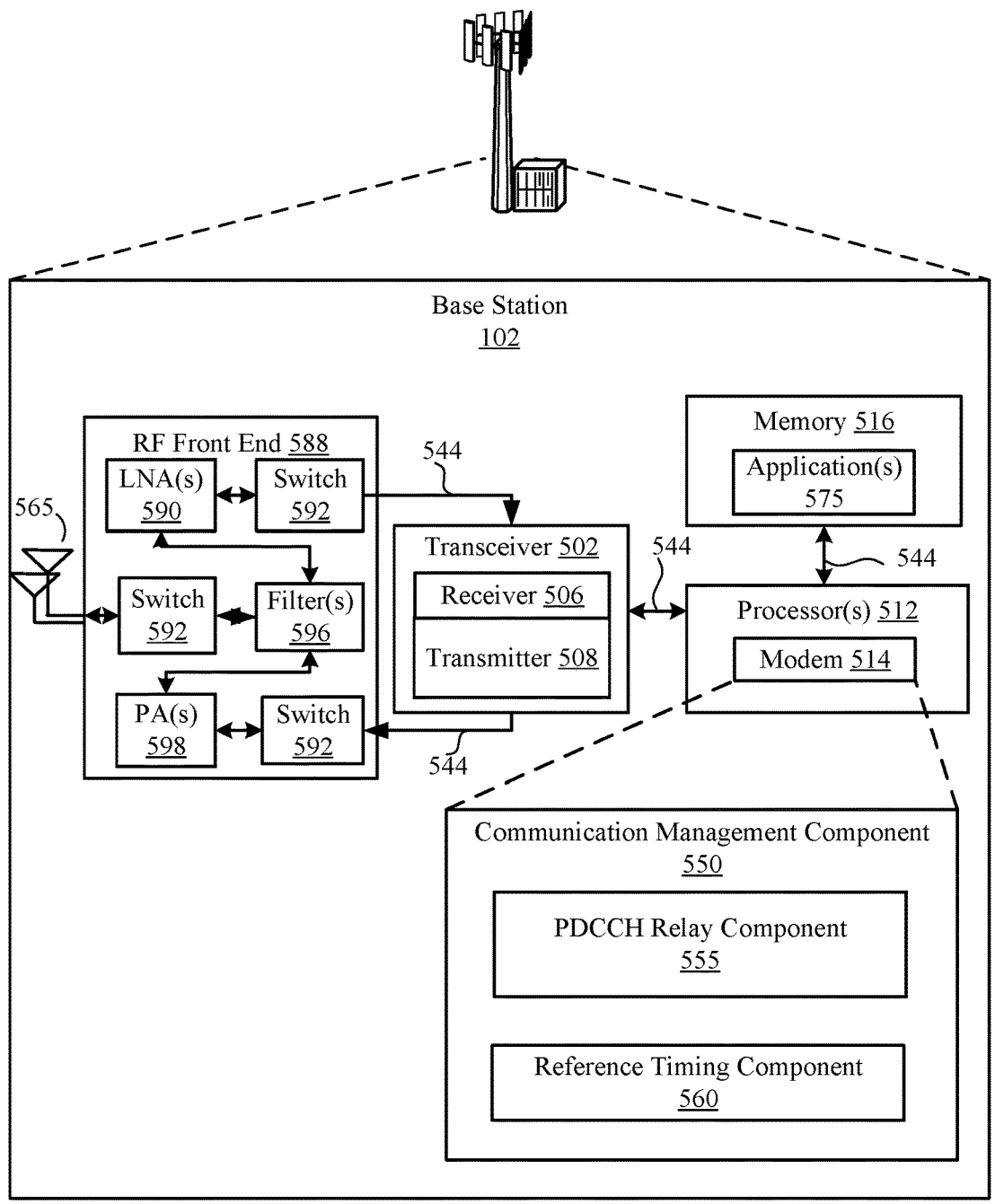
FIG. 5 is a schematic diagram of an example implementation of various components of the base station in accordance with various aspects of the present disclosure.

FIG. 5 illustrates hardware components and subcomponents of a device that may be base station 102 for implementing one or more methods (e.g., method 600) described herein in accordance with various aspects of the present disclosure. For example, an implementation of the base station 102 may include a variety of components, some of which have already been described above, but including components such as one or more processors 512, memory 516 and transceiver 502 in communication via one or more buses 544, which may operate in conjunction with the communication management component 550 to perform functions described herein related to including one or more methods (e.g., 600) of the present disclosure. In some examples, the communication management component 550 may include PDCCH relay component 555 for relaying (or tunneling) the Message 2 PDCCH content from the SgNB 150 to the UE 104. Further, in some examples, the base station 102 or gNB 150 may include a reference timing component 560 for providing the reference timing information to the UE 104.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to communication management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with communication management component 550 may be performed by transceiver 502.

The memory 516 may be configured to store data used herein and/or local versions of application(s) 575 or communication management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining communication management component 550 and/or one or more of its subcomponents, and/or data associated therewith.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102, or wireless transmissions transmitted to and by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 796 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device can communicate with a UE 104. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use.

Figure 6:
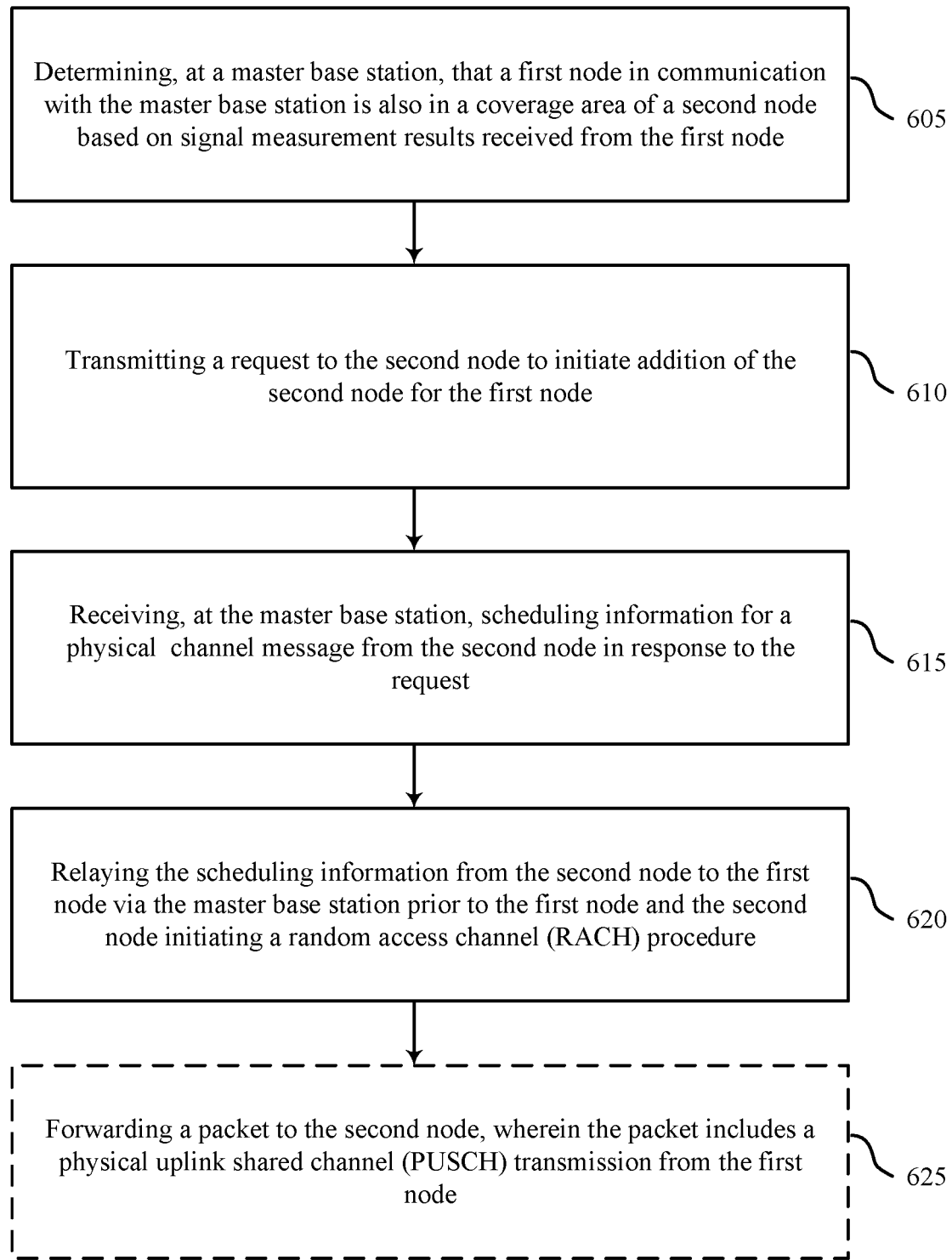
FIG. 6 is a flow diagram of an example of a method of wireless communication implemented by the base station in accordance with aspects of the present disclosure.

FIG. 6 is a flowchart of an example method 600 for wireless communications in accordance with aspects of the present disclosure. The method 600 may be performed using the base station 102. Although the method 600 is described below with respect to the elements of the base station 102, other components may be used to implement one or more of the steps described herein.

At block 605, the method 600 may include determining, at a master base station, that a first node in communication with the master base station is also in a coverage area of a second node based on signal measurement results received from the first node. The master base station may be a LTE base station and the second node may be a NR base station configured to communicate over mmW band. In some examples, the first node may be a UE and the second node may be a secondary base station (e.g., NR base station). In other examples, the first node may be a secondary base station (e.g., NR base station) and the second node may be a UE. Aspects of block 605 may be performed by communication management component 550 described with reference to FIG. 5. For example, the communication management component 550 may determine, at the MeNB 102 that a first node (e.g., UE 104) in communication with the MeNB 102 is also in a coverage area of a second node (e.g., SgNB 150) based on signal measurement results 315 received from the UE 104. For instance, the communication management component 550 may determine that the measurement results 315 satisfy an event condition (e.g., signal strength of SgNB 150 is greater than a threshold). Accordingly, the MeNB 102, the processor 512, and/or the modem 514 executing the communication management component 550 may provide means for determining, at a master base station, that a first node in communication with the master base station is also in a coverage area of a second node based on signal measurement results received from the first node.

At block 610, the method 600 may include transmitting a request to the second node to initiate addition of the second node for the first node. Aspects of block 610 may be performed by transceiver 502 and transmitter 508 described with reference to FIG. 5. For example, the transceiver 502 and transmitter 508 may transmit the SgNB addition request 320 to initiate addition of the SgNB 150 as a secondary cell for the UE 104. Alternatively, the SgNB addition request 320 may be a request to add the UE 104 to the SgNB 150. In an aspect, transmitting the request may include transmitting a configuration message such as the cell group configuration message 330. The cell group configuration message may instruct the UE 104 to add the SgNB as a serving cell. Accordingly, the MeNB 102, transceiver 502 and/or transmitter 508 may provide means for transmitting a request to the second node to initiate addition of the second node for the first node.

At block 615, the method 600 may include receiving, at the master base station, scheduling information for a message from the second node in response to the request. Aspects of block 615 may be performed by transceiver 502 and receiver 506 described with reference to FIG. 5. For example, the transceiver 502 and receiver 506 may receive the SgNB addition acknowledgment message 325, which may include scheduling information such as the Message 2 PDCCH content. Accordingly, the MeNB 102, transceiver 502 and/or receiver 506 may provide means for transmitting a request to the second node to initiate addition of the second node for the first node.

At block 620, the method 600 may include relaying the scheduling information from the second node to the first node via the master base station prior to the first node and the second node initiating a RACH procedure. In some examples, the scheduling information relayed to the first node by the master base station comprises one or more of frequency domain resource assignment, time domain resource assignment, MCS, or VRB-to-PRB information. Additionally, the scheduling information may further include one or more predetermined scheduled slot indices for the first node to search for the message (e.g., a PDSCH or PUSCH) after transmitting a PRACH preamble. For example, the scheduling information may correspond to content of a PDCCH that may be transmitted by the second node. Accordingly, the first node may receive the PDSCH without receiving a PDCCH. Further, in some examples, the second node may request the first node to transmit a RACH preamble for the RACH procedure. To this end, the first node may transmit a PUSCH to the second node, via the master base station, in response to the second node requesting a RACH preamble from the first node to initiate the RACH procedure. Aspects of block 620 may be performed by the PDCCH relay component 555 and the transceiver 502 described with reference to FIG. 5. For example, the PDCCH relay component 555 and the transceiver 502 may relay the scheduling information (e.g., the Message 2 PDCCH content) from the SgNB 150 to the UE 104 prior to the UE 104 and the SgNB 150 initiating the RACH procedure 340. Accordingly, the MeNB 102, the processor 512, and/or the modem 514 executing the PDCCH relay component 555 may provide means for relaying the scheduling information from the second node to the first node via the master base station prior to the first node and the second node initiating a RACH procedure.

At block 625, the method 600 may optionally include forwarding a packet to the second node, wherein the packet includes a physical uplink shared channel (PUSCH) transmission from the first node. Aspects of block 615 may be performed by transceiver 502 and transmitter 508 described with reference to FIG. 5. For example, the transceiver 502 and transmitter 508 may forward the PUSCH transmission from the UE 104 to the SgNB 150. Accordingly, the MeNB 102, transceiver 502 and/or transmitter 508 may provide means for forwarding a packet to the second node.

Figure 7:
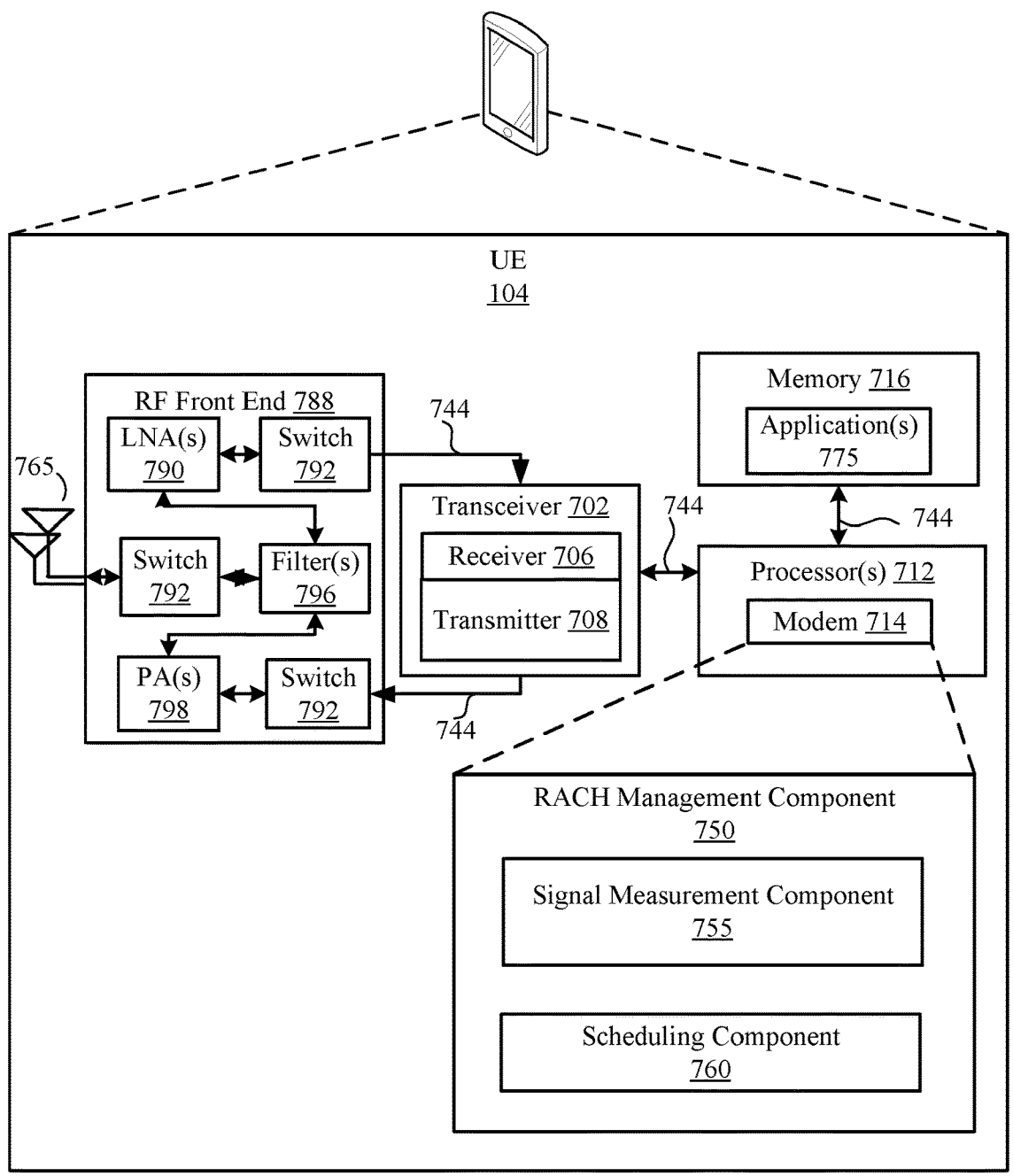
FIG. 7 is a schematic diagram of an example implementation of various components of the UE in accordance with various aspects of the present disclosure.

FIG. 7 illustrates hardware components and subcomponents of a device that may be a UE 104 for implementing one or more methods (e.g., method 800) described herein in accordance with various aspects of the present disclosure. For example, one example of an implementation of the UE 104 may include a variety of components, some of which have already been described above, but including components such as one or more processors 712, memory 716 and transceiver 702 in communication via one or more buses 744, which may operate in conjunction with the RACH management component 750 to perform functions described herein related to including one or more methods (e.g., 800) of the present disclosure. In some examples, the RACH management component 750 may include a signal measurement component 755 for measuring signal quality (e.g., RSSI) from one or more secondary base stations (e.g., NR base station 150). The RACH management component 750 may further include scheduling component 760 for monitoring the scheduled slots for Message 2 PDSCH based on the PDCCH scheduling information relayed from the secondary base station to the UE via the master base station.

The one or more processors 712, modem 714, memory 716, transceiver 702, RF front end 788 and one or more antennas 765, may be configured to support voice and/or data calls (simultaneously or non-simultaneously) in one or more radio access technologies. In an aspect, the one or more processors 712 can include a modem 714 that uses one or more modem processors. The various functions related to RACH management component 750 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with RACH management component 750 may be performed by transceiver 702.

The memory 716 may be configured to store data used herein and/or local versions of application(s) 775 or RACH management component 750 and/or one or more of its subcomponents being executed by at least one processor 712. The memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining RACH management component 750 and/or one or more of its subcomponents, and/or data associated therewith, when the UE 104 is operating at least one processor 712 to execute RACH management component 750 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE 104. Additionally, receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may include, but is not limited to, an RF transmitter.

Moreover, in an aspect, transmitting device may include the RF front end 788, which may operate in communication with one or more antennas 765 and transceiver 702 for receiving and transmitting radio transmissions, for example, wireless communications transmitted by at least one base station 102, and other wireless transmissions transmitted to and by UE 104. The RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, the LNA 790 can amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 798 may have specified minimum and maximum gain values. In an aspect, the RF front end 788 may use one or more switches 792 to select a particular PA 798 and its specified gain value based on a desired gain value for a particular application.

Also, for example, one or more filters 796 can be used by the RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, the RF front end 788 can use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 765 via the RF front end 788. In an aspect, the transceiver 702 may be tuned to operate at specified frequencies such that transmitting device can communicate with, for example, one or more base stations 102 or one or more cells associated with one or more base stations 102. In an aspect, for example, the modem 714 can configure the transceiver 702 to operate at a specified frequency and power level based on the configuration of the transmitting device and the communication protocol used by the modem 714.

In an aspect, the modem 714 can be a multiband-multi-mode modem, which can process digital data and communicate with the transceiver 702 such that the digital data is sent and received using the transceiver 702. In an aspect, the modem 714 can be multiband and be configured to support multiple frequency bands for a specific communications protocol. In an aspect, the modem 714 can be multimode and be configured to support multiple operating networks and communications protocols. In an aspect, the modem 714 can control one or more components of transmitting device (e.g., RF front end 788, transceiver 702) to enable transmission and/or reception of signals from the network based on a specified modem configuration. In an aspect, the modem configuration can be based on the mode of the modem 714 and the frequency band in use. In another aspect, the modem configuration can be based on UE configuration information associated with transmitting device as provided by the network during cell selection and/or cell reselection.

Figure 8:
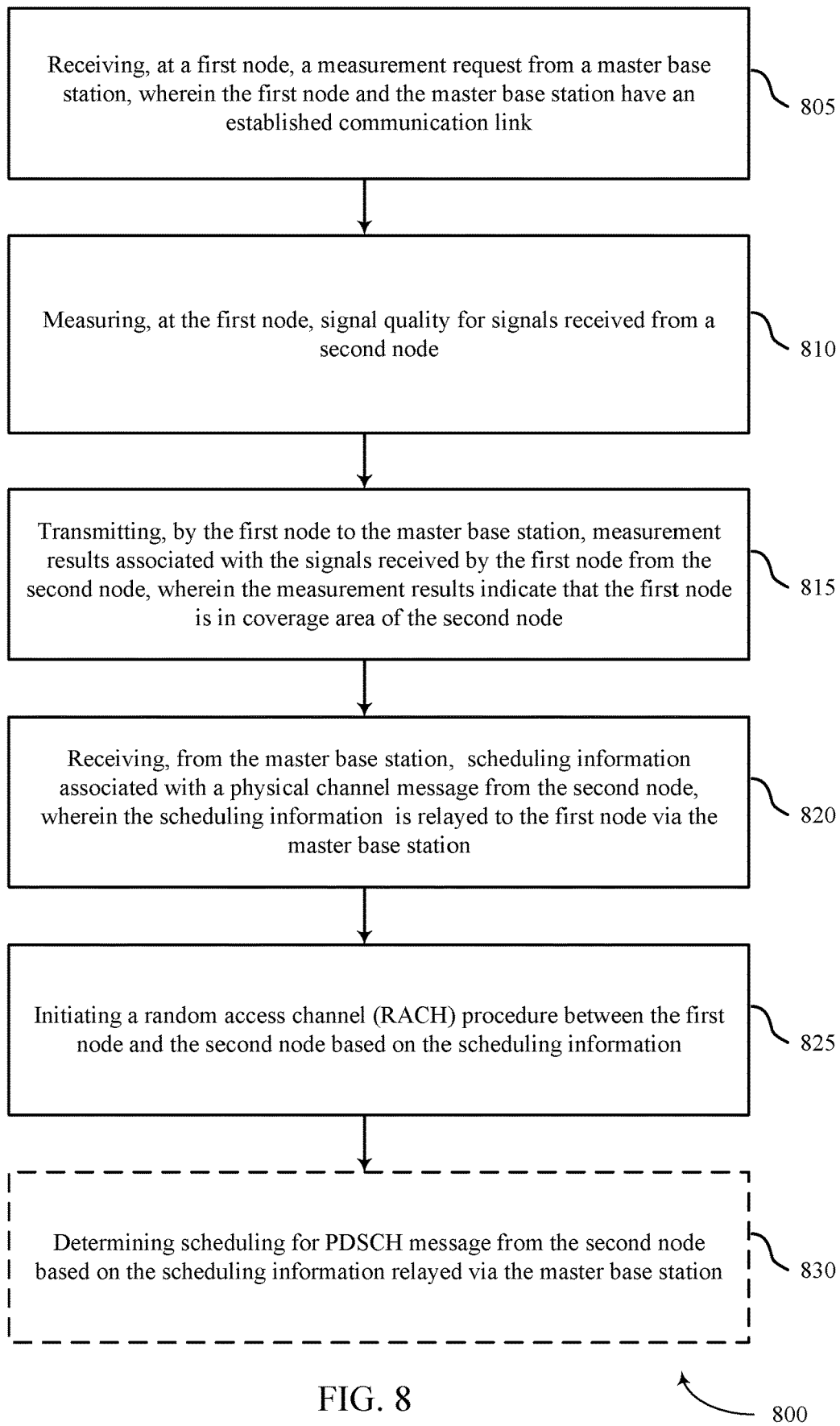
FIG. 8 is a flow diagram of an example of a method of wireless communication implemented by the UE in accordance with aspects of the present disclosure.

FIG. 8 is a flowchart of an example method 800 for wireless communications in accordance with aspects of the present disclosure. The method 800 may be performed using the UE 104. Although the method 800 is described below with respect to the elements of the UE 104, other components may be used to implement one or more of the steps described herein.

At block 805, the method 800 may include receiving, at a first node, a measurement request from a master base station, wherein the first node and the master base station have an established communication link. In some examples, a first node may be a UE. In other examples, the first node may be a base station (e.g., a NR base station 150). Aspects of block 805 may be performed by the transceiver 702 and/or receiver 706 described with reference to FIG. 7. For example, the UE 104 may receive the measurement configuration 305 from the MeNB 102 via an established communication link 120. Accordingly, the transceiver 702 and/or receiver 706 may provide means for receiving, at a first node, a measurement request from a master base station.

At block 810, the method 800 may include measuring, at the first node, signal quality for signals received from a second node. The master base station may be a LTE base station and the second node may be a NR base station configured to communicate over a mmW band. Alternatively, the second node may be a UE. In some examples, signal measurements may include one or more of RSSI, RSRP, or RSSQ associated with the SgNB to determine whether the UE is in the coverage area of the SgNB. Aspects of block 810 may be performed by the signal measurement component 755 described with reference to FIG. 7. For example, the signal measurement component 755 may measure signal quality for signals received from the SgNB 150 to obtain measurements 310. Accordingly, the UE 104, the processor 712, and/or the modem 714 executing the signal measurement component 755 may provide means for measuring, at the first node, signal quality for signals received from a second node.

At block 815, the method 800 may include transmitting, by the first node to the master base station, measurement results associated with the signals received by the first node from the second node, wherein the measurement results indicate that the first node is in the coverage area of the second node. Aspects of block 810 may be performed by the transceiver 702 and/or the transmitter 708 described with reference to FIG. 7. For example, the transceiver 702 and/or the transmitter 708 may transmit, from the UE 104 to the MeNB 102, the measurement results 315 associated with the signals received by the UE 104 from the SgNB 150. Accordingly, the transceiver 702 and/or the transmitter 708 may provide means for transmitting, by the first node to the master base station, measurement results associated with the signals received by the first node from the second node.

At block 820, the method 800 may include receiving, from the master base station, scheduling information associated with a physical channel message from the second node, wherein the scheduling information is relayed to the first node via the master base station. In some examples, the scheduling information relayed to the UE by the master base station comprises one or more of frequency domain resource assignment, time domain resource assignment, MCS, or VRB-to-PRB information. Additionally, the PDCCH scheduling information may further include one or more predetermined scheduled slot indices for the UE to search for the PDSCH message after transmitting a PRACH preamble. Aspects of block 820 may be performed by the transceiver 702 and/or the receiver 706 described with reference to FIG. 7. For example, the transceiver 702 and/or the receiver 706 may receive, from the MeNB 102, scheduling information (e.g., PDCCH Content) associated with a physical channel message (e.g., a PDSCH or PUSCH) from the SgNB 150. Accordingly, the transceiver 702 and/or the receiver 706 may provide means for receiving, from the master base station, scheduling information associated with a physical channel message from the second node.

At block 825, the method 800 may include initiating a RACH procedure between the first node and the second node based on the scheduling information. Aspects of block 825 may be performed by the RACH management component 750 described with reference to FIG. 7. For example, the RACH management component 750 may initiate the RACH procedure 340 between the UE 104 and the SgNB 150 based on the scheduling information. For instance, the RACH management component 750 may initiate transmission of a PRACH preamble and monitor for a Message 2 PDSCH transmitted according to the scheduling information. Accordingly, the UE 104, the processor 712, and/or the modem 714 executing the RACH management component 750 may provide means for initiating a RACH procedure between the first node and the second node based on the scheduling information.

At block 830, the method 800 may optionally include determining scheduling for PDSCH message from the second node based on the scheduling information relayed via the master base station. Aspects of block 830 may be performed by the scheduling component 760 described with reference to FIG. 7. In some examples, the UE may search for one or more potential scheduled slot indices identified in the scheduling information that is tunneled to the UE via the master base station. As such, the UE may search the identified one or more potential scheduled slots for Message 2 PDSCH after transmitting the PRACH preamble. The potential slots may start from slot 0 in frame 0 with a predetermined periodicity of x slots. For example, potential slots with periodicity of x slots may start from a slot offset after the end of a RACH occasion with the transmitted preamble. In some aspects, the UE may restrict monitoring for the Message 2 PDSCH to the potential scheduling slots identified in the scheduling information within the response window responding to the transmitted preamble. Accordingly, the UE 104, the processor 712, and/or the modem 714 executing the scheduling component 760 may provide means for determining scheduling for PDSCH message from the second node based on the scheduling information relayed via the master base station.

In other examples, the method may include transmitting a PRACH preamble to the secondary base station to initiate the RACH procedure, and receiving a UE dedicated sequence for reference timing from the secondary base station in response to transmission of the PRACH preamble. The method may further include determining a scheduled slot for the PDSCH message during a response window based on the UE dedicated sequence, and searching the scheduled slot during a response window for the PDSCH message. In some aspects, the UE dedicated sequence may be a PDCCH DMRS, CSI-RS, TRS. The sequence may further be scrambled/initialized by a UE dedicated seed, which can also be tunneled to the UE. Based on the UE dedicated seed that may be included in PDCCH scheduling information, the UE may identify the UE dedicated sequence within the response window of transmission of the PRACH preamble. The UE dedicated seed, for example, may be determined at least by information of the PRACH resource dedicated to the UE (e.g., dedicated preamble index). The sequence may also be repeated with a configuration message tunneled to the UE and the UE may restrict the monitoring for the UE dedicated sequence only in the response window corresponding to the transmitted preamble.

In some examples, the first node may further transmit a PUSCH content to the second node via the master base station. The PUSCH content may be sent by the first node in response to a request from the second node for a RACH preamble transmission by the first node in the RACH procedure with the second node. The PUSCH content may include a first node ID (e.g., C-RNTI, buffer status report, service request, etc.). Thus, in some aspects, the first node may transmit a PRACH preamble to the second node to initiate the RACH procedure and receive a response from the second node in response to transmission of the PRACH preamble. The first node may further transmit a UE dedicated sequence for reference timing from the first node in response to reception of the response. The transmission of the first node dedicated sequence may be to replace transmission of the PUSCH whose content is relayed to the second node via the master base station.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
    determining, at a master base station, that a first node in communication with the master base station is also in a coverage area of a second node based on signal measurement results received from the first node;
    transmitting a request to the second node to initiate addition of the second node for the first node;
    receiving, at the master base station, scheduling information for a physical channel message to be transmitted from the second node in response to the request; and
    relaying the scheduling information for the physical channel message to be transmitted from the second node to the first node via the master base station prior to the first node and the second node initiating a random access channel (RACH) procedure.

2. The method of claim 1, wherein the scheduling information relayed to the first node by the master base station comprises one or more of frequency domain resource assignment for the physical channel message, time domain resource assignment for the physical channel message, modulation coding scheme (MCS) for the physical channel message, or virtual resource block (VRB)-to-physical resource block (PRB) information for the physical channel message.

3. The method of claim 2, wherein the physical channel message is a physical downlink shared channel (PDSCH) message, and wherein the scheduling information further comprises one or more predetermined scheduled slot indices for the first node to search for the PDSCH message after transmitting a PRACH preamble.

4. The method of claim 1, wherein the master base station is a long term evolution (LTE) base station and the second node is a new radio (NR) base station configured to communicate over millimeter wave (mmW) band.

5. The method of claim 1, further comprising:
    forwarding, from the master base station, a packet to the second node, wherein the packet includes a physical uplink shared channel (PUSCH) transmission from the first node.

6. The method of claim 1, wherein the first node is a base station and the second node is a user equipment (UE).

7. The method of claim 1, wherein the first node is a user equipment (UE) and the second node is a base station.

8. An apparatus for wireless communications, comprising:
    a memory configured to store instructions; and
    a processor communicatively coupled with the memory, the processor configured to execute the instructions to:
        determine, at a master base station, that a first node in communication with the master base station is also in a coverage area of a second node based on signal measurement results received from the first node;
        transmit a request to the second node to initiate addition of the second node for the first node;
        receive, at the master base station, scheduling information for a physical channel message to be transmitted from the second node in response to the request; and
        relay the scheduling information for the physical channel message to be transmitted from the second node to the first node via the master base station prior to the first node and the second node initiating a random access channel (RACH) procedure.

9. The apparatus of claim 8, wherein the scheduling information relayed to the first node by the master base station comprises one or more of frequency domain resource assignment for the physical channel message, time domain resource assignment for the physical channel message, modulation coding scheme (MCS) for the physical channel message, or virtual resource block (VRB)-to-physical resource block (PRB) information for the physical channel message.

10. The apparatus of claim 9, wherein the physical channel message is a physical downlink shared channel message (PDSCH) message, and wherein the scheduling information further comprises one or more predetermined scheduled slot indices for the first node to search for the PDSCH message after transmitting a PRACH preamble.

11. The apparatus of claim 8, wherein the master base station is a long term evolution (LTE) base station and the second node is a new radio (NR) base station configured to communicate over millimeter wave (mmW) band.

12. The apparatus of claim 8, wherein the first node is a base station and the second node is a user equipment (UE).

13. The apparatus of claim 8, wherein the first node is a user equipment (UE) and the second node is a base station.

14. A method for wireless communications, comprising:
    receiving, at a first node, a measurement request from a master base station, wherein the first node and the master base station have an established communication link;
    measuring, at the first node, signal quality for signals received from a second node;
    transmitting, by the first node to the master base station, measurement results associated with the signals received by the first node from the second node, wherein the measurement results indicate that the first node is in coverage area of the second node;
    receiving, from the master base station, scheduling information associated with a physical channel message to be transmitted from the second node to the first node, wherein the scheduling information is relayed to the first node via the master base station; and
    initiating a random access channel (RACH) procedure between the first node and the second node based on the scheduling information.

15. The method of claim 14, wherein the physical channel message is a physical downlink shared channel (PDSCH), the method further comprising:
    determining, at the first node, scheduling for the PDSCH message by the second node based on the scheduling information relayed via the master base station.

16. The method of claim 15, wherein the scheduling information relayed to the first node by the master base station comprises one or more of frequency domain resource assignment for the physical channel message, time domain resource assignment for the physical channel message, modulation coding scheme (MCS) for the physical channel message, or virtual resource block (VRB)-to-physical resource block (PRB) information for the physical channel message.

17. The method of claim 15, wherein the scheduling information further comprises one or more predetermined scheduled slot indices for the first node to search for the PDSCH message after transmitting a PRACH preamble.

18. The method of claim 14, further comprising:
transmitting a PRACH preamble to the second node to initiate the RACH procedure;
receiving a first node dedicated sequence for reference timing from the second node in response to transmission of the PRACH preamble;
determining a scheduled slot for the physical channel message during a response window based on the first node dedicated sequence; and
searching the scheduled slot during a response window for the physical channel message.

19. The method of claim 14, wherein the master base station is a long term evolution (LTE) base station and the second node is a new radio (NR) base station configured to communicate over millimeter wave (mmW) band.

20. The method of claim 14, further comprising:
transmitting, by the first node, a physical uplink shared channel (PUSCH) content to the second node, wherein the PUSCH content is sent by the first node in response to a request from the second node for a RACH preamble transmission by the first node in RACH procedure with the second node.

21. The method of claim 20, wherein the PUSCH content includes a first node identification (ID).

22. The method of claim 14, further comprising:
transmitting a PRACH preamble to the second node to initiate the RACH procedure;
receiving a response from the second node in response to transmission of the PRACH preamble; and
transmitting a first node dedicated sequence for reference timing from the first node in response to reception of the response.

23. The method of claim 22, wherein the transmission of the first node dedicated sequence is to replace transmission of a physical uplink shared channel (PUSCH) whose content is relayed to the second node via the master base station.

24. An apparatus for wireless communications, comprising:
a memory configured to store instructions; and
a processor communicatively coupled with the memory, the processor configured to execute the instructions to:
receive, at a first node, a measurement request from a master base station, wherein the first node and the master base station have an established communication;
measure, at the first node, signal quality for signals received from a second node;
transmit, by the first node to the master base station, measurement results associated with the signals received by the first node from the second node, wherein the measurement results indicate that the first node is in coverage area of the second node;
receive, from the master base station, scheduling information associated with a physical channel message to be transmitted from the second node to the first node, wherein the scheduling information is relayed to the first node via the master base station; and
initiate a random access channel (RACH) procedure between the first node and the second node based on the scheduling information.

25. The apparatus of claim 24, wherein the processor is further configured to execute the instructions to:
determine, at the first node, scheduling for PDSCH message by the second node based on the scheduling information relayed via the master base station.

26. The apparatus of claim 25, wherein the scheduling information relayed to the first node by the master base station comprises one or more of frequency domain resource assignment for the physical channel message, time domain resource assignment for the physical channel message, modulation coding scheme (MCS) for the physical channel message, or virtual resource block (VRB)-to-physical resource block (PRB) information for the physical channel message.

27. The apparatus of claim 24, wherein the scheduling information further comprises one or more predetermined scheduled slot indices for the first node to search for a physical downlink shared channel (PDSCH) message after transmitting a PRACH preamble.

28. The apparatus of claim 24, wherein the processor is further configured to execute the instructions to:
transmit a physical RACH (PRACH) preamble to the second node to initiate the RACH procedure;
receive a first node dedicated sequence for reference timing from the second node in response to transmission of the PRACH preamble;
determine a scheduled slot for the physical channel message during a response window based on the first node dedicated sequence; and
search the scheduled slot during a response window for the physical channel message.

29. The apparatus of claim 24, wherein the master base station is a long term evolution (LTE) base station and the second node is a new radio (NR) base station configured to communicate over millimeter wave (mmW) band.

30. The apparatus of claim 24, wherein the processor is further configured to execute the instructions to:
transmit, by the first node, a physical uplink shared channel (PUSCH) content to the second node, wherein the PUSCH content is sent by the first node in response to a request from the second node for a RACH preamble transmission by the first node in the RACH procedure with the second node.

* * * * *